US006340210B1

(12) United States Patent
Handa et al.

(10) Patent No.: US 6,340,210 B1
(45) Date of Patent: Jan. 22, 2002

(54) WHEEL FOR VEHICLE (75) Inventors: Akio Handa; Yuji Maki, both of Wako; Shoji Suzuki; Kiyoshi Amaki, both of Osaka; Junichi Sato, Kaga Ishikawa Pref., all of (JP)

(73) Assignees: Honda Giken Kogyo Kabushiki Kaisha, Tokyo; Zeniya Aluminum Engineering, Limited, Osaka; Daido Kogyo Co., Ltd, Ishikawa Pref., all of (JP)

( * ) Notice: Subject to any disclaimer, the term of this patent is extended or adjusted under 35 U.S.C. 154(b) by 0 days.

(21) Appl. No.: 09/517,768

(22) Filed: Mar. 3, 2000

(30) Foreign Application Priority Data

Mar. 4, 1999 (JP) ............................. 11-057271
Feb. 17, 2000 (JP) ............................. 12-040229

(51) Int. Cl.$^7$ .............................. B60B 3/10; B60B 3/00
(52) U.S. Cl. ..................... 301/64.4; 301/64.2; 301/64.3
(58) Field of Search ..................... 301/9.1, 9.2, 35.61, 301/35.62, 37.1, 64.3, 64.4 I, 65, 95, 96, 64.2, 108.1, 108.3

(56) References Cited

U.S. PATENT DOCUMENTS

| | | | | |
|---|---|---|---|---|
| 2,148,707 A | * | 2/1939 | Notson ..................... 301/35.61 |
| 2,559,975 A | * | 7/1951 | Lange et al. ................. 301/64.4 |
| 3,679,266 A | * | 7/1972 | Jenkins ...................... 301/35.62 |
| 3,826,538 A | * | 7/1974 | Lipper ........................ 301/64.4 |
| 3,909,065 A | * | 9/1975 | Main ........................... 301/64.3 |
| 4,223,952 A | * | 9/1980 | Weld ........................... 301/64.4 |
| 4,640,330 A | * | 2/1987 | Frassica ..................... 301/64.4 |
| 5,188,429 A | * | 2/1993 | Heck et al. ................. 301/64.3 |
| 5,435,629 A | * | 7/1995 | Suzuki ........................ 301/64.4 |
| 6,000,762 A | * | 12/1999 | Chang ........................ 301/64.4 |

FOREIGN PATENT DOCUMENTS

| JP | 62-2401 | 6/1985 |
| JP | 11-245602 | 3/1998 |

* cited by examiner

Primary Examiner—S. Joseph Morano
Assistant Examiner—Jason R. Bellinger
(74) Attorney, Agent, or Firm—Merchant & Gould P.C.

(57) ABSTRACT

A wheel for a vehicle comprises first and second wheel halves joined together, and a center plate being generally cross-shaped. Each wheel half has a disk portion and a rim continuing from the disk portion. The center plate is interposed between the disk portions and has a diameter smaller than an outside diameter of each of the disk portions. The first and second wheel halves and the center plate are unitarily connected together by means of a plurality of sockets each having a countersunk head and a cylindrical shank. This arrangement increases freedom of design of the wheel and facilitates production of the same.

5 Claims, 7 Drawing Sheets

WHEEL FOR VEHICLE

BACKGROUND OF THE INVENTION

1. Field of the Invention:

The present invention relates generally to a wheel for a vehicle and, more particularly, to a vehicular wheel which allows improvement of an external appearance thereof.

2. Description of the Related Art:

Conventionally, split rim wheels for vehicles have been known. These wheels comprise two wheel halves joined together, each wheel half being cup-shaped and having a disk portion forming a bottom thereof and a rim portion forming a peripheral wall thereof. Typical examples of such split rim wheels are disclosed in, for example, Japanese Utility Model Laid-Open Publication No. SHO-62-2401 entitled "Composite Wheel of Light Alloy" and Japanese Patent Laid-Open Publication No. HEI-11-245602 entitled "Wheel for Vehicle".

The wheel disclosed in Japanese Utility Model Laid-Open Publication No. SHO-62-2401 comprises two cup-shaped wheel members each having a flange at a bottom thereof, and a connector plate interposed between the flanges. An outer periphery of the connector plate is weld-connected to each wheel member, whereby the wheel members and the connector plate are unitarily connected together to provide the wheel.

Similarly, the wheel disclosed in Japanese Patent Laid-Open Publication No. HEI-11-245602 comprises cup-shaped outer and inner rims, and an insert plate interposed between the rims. The outer rim and inner rim are weld-connected together with the insert plate sandwiched therebetween to thereby provide the unitarily formed wheel.

In the wheel disclosed in Japanese Utility Model Laid-Open Publication No. SHO-62-2401, each of the flanges and connector plate is in a simple flat-plate form. This does not meet the diversified needs and liking of users. Wheels wherein flanges are designed to have curved planes and irregularities as found in a single-piece flange of a conventional steel wheel are more favored now.

However, in the prior art wheel just described, it is difficult to provide curved planes and irregularities on its flange alone, because the adjoining connector plate limits the freedom of design. In certain occasions, one may propose to provide curved planes and irregularities on both the flange and the connector plate but this requires high precision pressing work, thus resulting in an increased cost of production. The same applies to the prior art wheel disclosed in Japanese Patent Laid-Open Publication No. HEI-11-245602.

SUMMARY OF THE INVENTION

It is therefore an object of the present invention to provide a wheel for a vehicle, which is capable of increasing the degree of freedom of design of the wheel and facilitates the manufacture of the latter.

To achieve the above object, according to one aspect of the present invention, there is provided a wheel for a vehicle, which comprises: first and second wheel halves joined together, each of the wheel halves having a disk portion and a rim continuing from the disk portion; a center plate inter-posed between the disk portions of the wheel halves, the center plate being generally cross-shaped and having a diameter smaller than an outside diameter of each of the disk portions; and the first wheel half, the second wheel half and the center plate being unitarily connected together by means of a plurality of sockets each having a countersunk head and a cylindrical shank.

By virtue of the center plate being cross-shaped, it becomes possible to make the wheel light in weight compared to where the center plate is in the form of a circular plate. In addition, since those portions of the first and second wheel halves which are not opposed to four projections of the cross-shaped center plate become dual-structured, it becomes posible to provide those portions with recesses, inclined surfaces and windows which impart an improved external appearance to the wheel.

Desirably, the first and second wheel halves are connected together by a weld which is offset from the center plate in a direction toward that one of the first and second wheel halves which is positioned closer to the vehicle when the wheel is mounted to the vehicle. By thus displacing the weld from the center plate, it becomes possible to make each disk portion into a cup shape. This leads to the advantage that the wheel halves can be assembled and weld-connected together with improved precision and increased ease by fitting the cup-shaped disk portions together.

It is preferred that the rim of the one wheel half positioned closer to the vehicle has a flange at a top end thereof and that the flange has a flank formed on a side surface thereof so that a clearance is defined between the flange and a tie rod, connected to a knuckle provided in the wheel, when the tie rod is brought to a position closest to the one wheel half by turning a handlebar of the vehicle. With this arrangement, it becomes possible to avoid interferences between the rim flange and the tie rod.

According to another aspect of the present invention, there is provided a wheel for a vehicle, which comprises: first and second wheel halves joined together, each of the wheel halves having a disk portion and a rim continuing from the disk portion; a center plate inter-posed between the disk portions of the wheel halves, the center plate having a diameter smaller than an outside diameter of each of the disk portions; the first wheel half, the second wheel half and the center plate being unitarily connected together by means of a plurality of sockets each having a countersunk head and a cylindrical shank; and the second wheel halt being positioned closer to the vehicle when the wheel is mounted to a hub which in turn is connected to an axle of the vehicle, the disk portion of the second wheel half having recesses at portions thereof opposed to a peripheral edge of the hub.

By virtue of the recesses provided in opposed relation to the peripheral edge of the hub, interferences between the hut peripheral edge and the disk portion of the second wheel half can be avoided.

Preferably, at least one of the disk portions has a discharge hole for discharging water and a wheel surface treating liquid accumulated between the disk portions. With this arrangement, it becomes possible to prevent the disk portions from getting rusted and corroded.

In a desired form, the center plate has a hole formed centerally thereof while the disk portion of the second wheel half has a centrally-formed hole larger than the hole of the center plate.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

The present invention will be described in relation to its particular application to a motorized buggy. However, such an application is merely exemplary in nature and is in no way intended to limit the invention, its application or uses.

Figure 1:
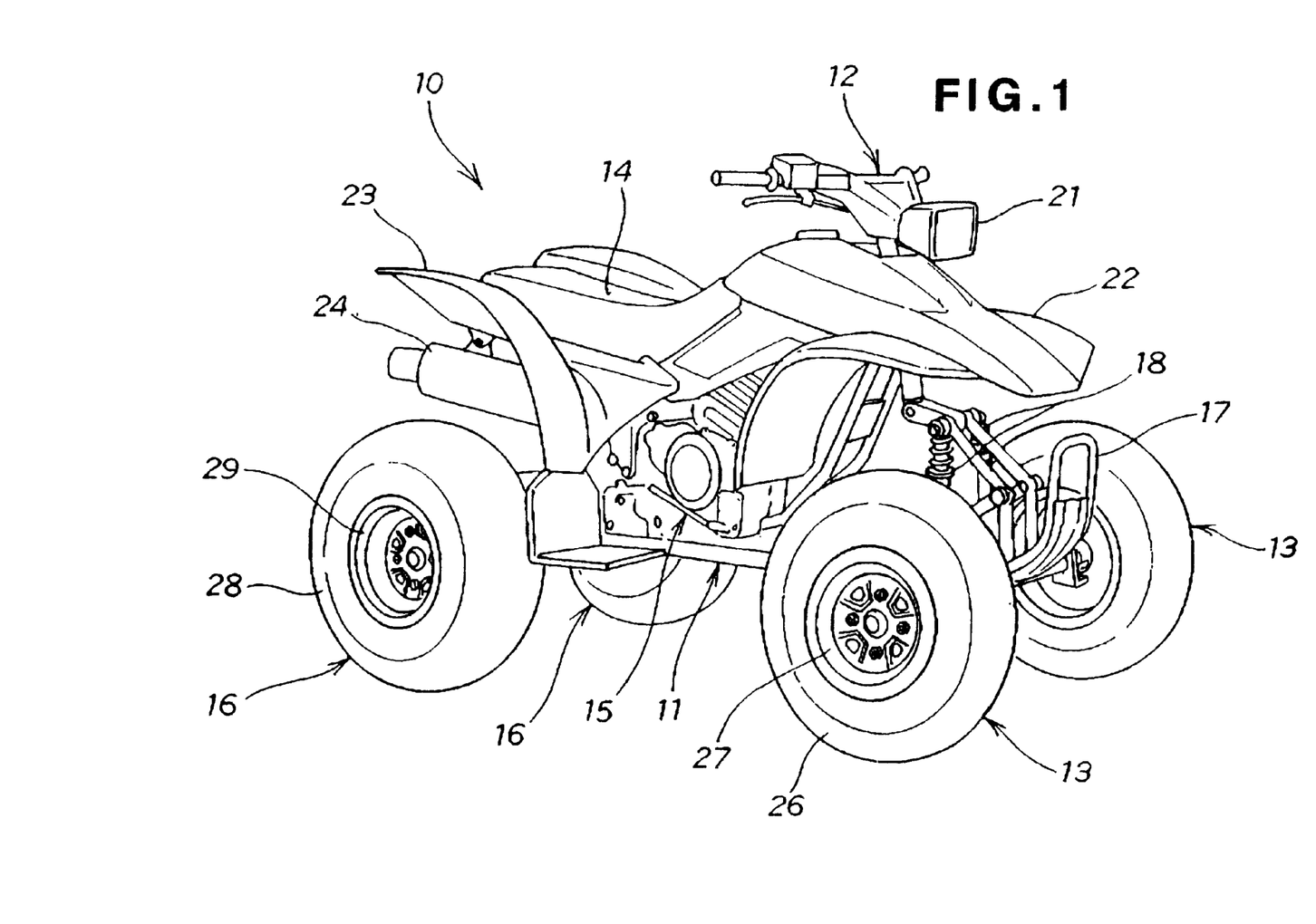
FIG. 1 is a perspective view illustrating a vehicle having wheels according to the present invention.

As shown in FIG. 1, the motorized buggy 10 comprises a handlebar 12 rotatably mounted to a vehicle body or chassis 11, front wheel assemblies 13, 13 steerably connected to the handlebar 12 via a steering gear device (not shown), a driver seat 14 mounted on an upper part of the vehicle body 11, a power unit 15 comprised of an engine and a transmission disposed under the seat 14, and rear wheel assemblies 16, 16 driven by the power unit 15. Reference numeral 17 designates a bumper; 18 is a front suspension unit; 21 is a headlamp; 22 is a front fender; 23 is a rear fender; and 24 is a muffler.

Each front wheel assembly 13 is comprised of a tire 26 an a front wheel 27 of light alloy. Similarly, each rear wheel assembly 16 is comprised of a tire 28 and a rear wheel 29 of light alloy. Both the front and rear wheels 27, 29 employ the present invention. They may be identical to each other, or may be different in their offset amounts, rim diameters and rim widths insofar as they have the same basic principle of the present invention. Thus, discussion will be made chiefly as to the front wheel 27.

Being designed as an ATV (all terrain vehicle), the buggy 10 is light in weight, compact, capable of making sharp turns and easy to operate. Thus, the buggy 10 may be best used for off-road works and activities related to agriculture, cattle breeding, hunting, game warden and so forth.

Figure 2:
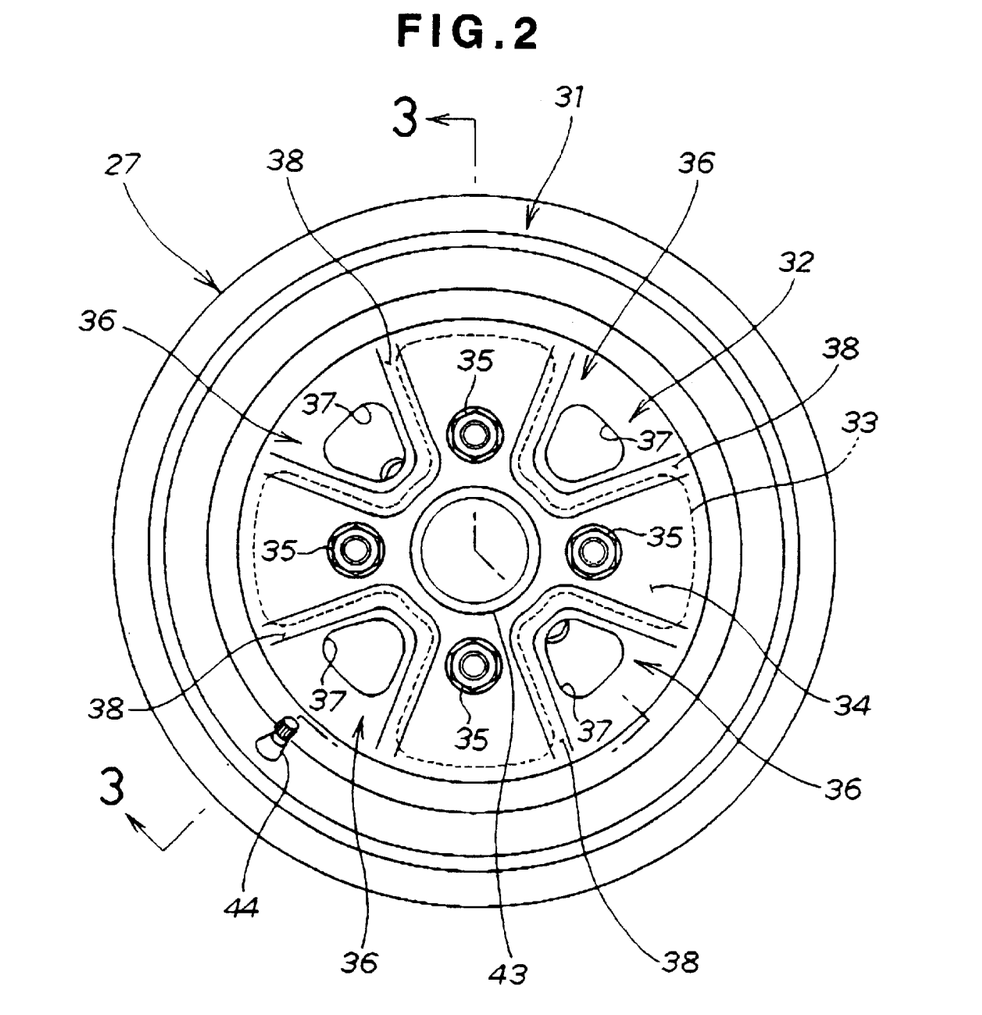
FIG. 2 is an enlarged front elevational view illustrating one of the wheels according to the present invention.
Figure 3:
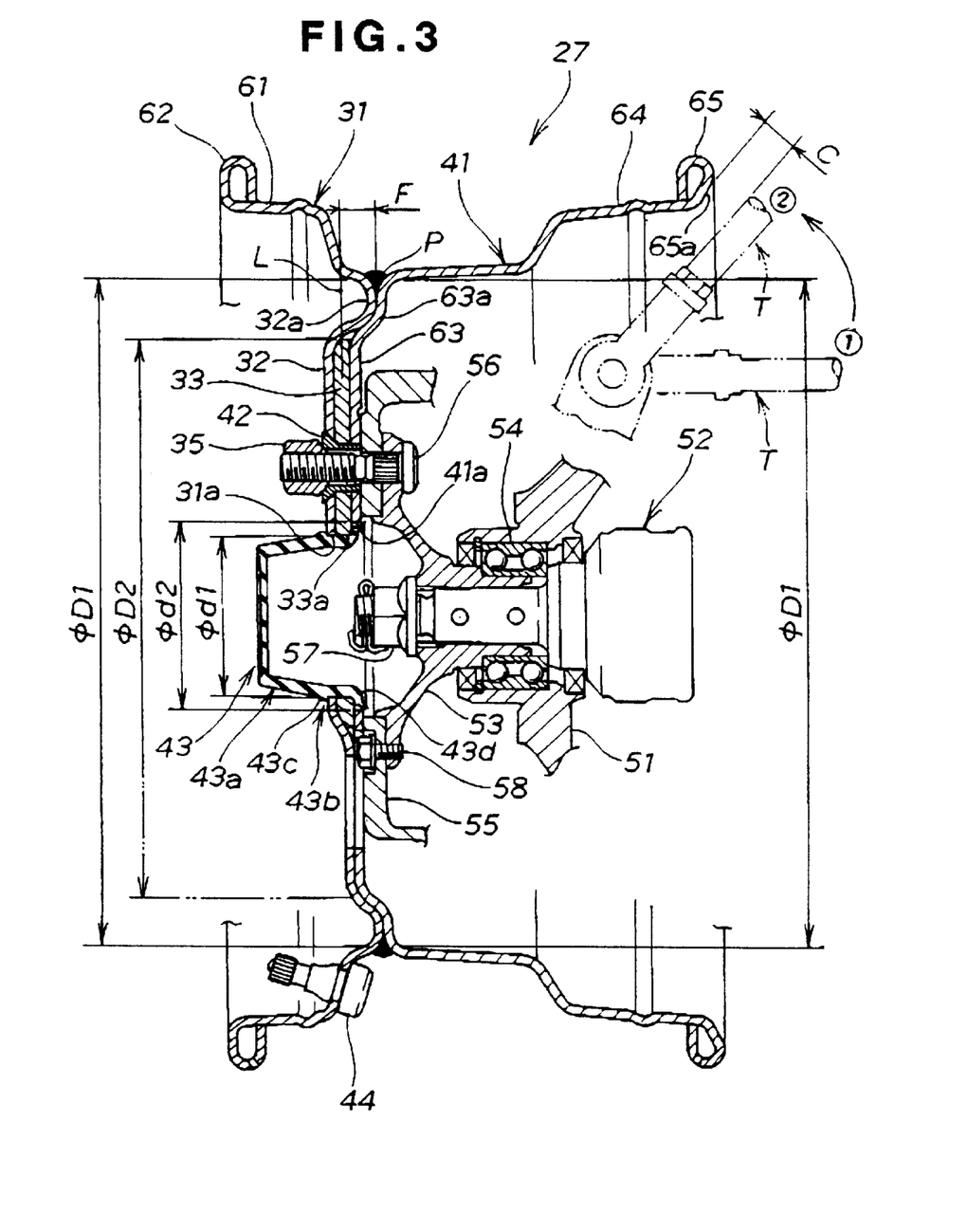
FIG. 3 is a cross-sectional view taken along line 3—3 of FIG. 2.

As can be appreciated from FIGS. 2 and 3, the front wheel 27 comprises two split halves, namely, a cup-shaped outer wheel half 31 and a cup-shaped inner wheel half 41 connected together by welding. The front wheel 27 also comprises a generally cross-shaped center plate 33 disposed between the outer and inner wheel halves 31, 41.

Referring particularly to FIG. 2, the outer wheel half 31 includes a disk portion 32 having a planar or flat portion 34 configured similarly to the center plate 33. The flat portion 34 is secured to a hub, discussed below, by means of plural nuts 35 positioned circumferentially of the outer wheel half 31 and threadedly engaged with bolts to be discussed below. The disk portion 32 is depressed at parts where the center plate 33 is not present on a back side thereof to thereby provide recessed portions 36 between two adjacent ones of the nuts 35. Each recessed portion 36 has an opening as a window 37. The recessed portions 36 are continuous with the flat portion 34 through sloped portions 38.

As best shown in FIG. 3, the outer wheel half 31, center plate 33 and inner wheel half 41 are fixedly connected together by means of the nuts 35 and bolts 56 (only one shown) threadedly engaged with the nuts 35.

In FIG. 3, designated by reference numeral 42 is a washer with a sleeve that forms a bushing for receiving one of the nuts 35. The outer wheel half 31, center plate 33 and inner wheel half 41 have respective center holes 31a, 33a, 41a provided centrally thereof for holding a center cap 43. Designated by reference numeral 44 is an air valve through which to inject air into the tire 26.

The outer and inner wheel halves 31, 41 ire connected by welding as at P. The weld P is offset by an amount of F inwardly of the buggy, that is, in a direction toward the inner wheel half, from a straight line L passing vertically of the center plate 33 at a thicknesswise center of the latter.

Reference numeral 51 designates a knuckle supported by an arm (not shown) which is vertically movably mounted to the vehicle body 11; 52 is a drive shaft or an axle connected to the power unit 15 (see FIG. 1); 53 is the hub having one side to which the knuckle 51 is rotatably mounted via a bearing 54 and an opposite side connected to the drive shaft 52; 55 is a brake drum mounted to the hub 53; 56 is one of the bolts fixed to the hub 53 to thereby secure the front wheel 27 to the hub 53 via the brake drum 55; 57 is a nut for fixing a top end of the drive shaft 52 to the hub 53; and 58 is a bolt for mounting the brake drum 55 to the hub 53.

As shown in FIG. 3, the outer wheel half 31 also has a generally cylindrical outer rim 61 continuing from the disk portion 32 and having a flange 62 at a free end thereof. The disk portion 32 has an outer curved or depressed portion 32a.

Similarly to the outer wheel halt 31, the inner wheel half 41 includes a disk portion 63 and a generally cylindrical inner rim 64 continuing from the disk portion 63 having a flange 65 at a free end thereof. Reference numeral 63a designates an inner curved or bent portion of the disk: portion 63.

The flange 65 of the inner wheel half 41 is asymmetric with respect to the flange 62 of the outer wheel half 31 and has a flank 65a provided slantingly on a side thereof. The flank 65a is provided so that a clearance C is left between the flange 65 and a tie rod T operatively connected to the knuckle 51 when, by turning the handlebar 12, the tie rod T is brought to a position (2) closest to the flange 65 from a position (1) in which the buggy 10 is running linearly. The described positional relation between the flank 65a and tie rod T appears when the flank and tie rod are taken in top plan.

As shown in FIG. 3, the center plate 33 has an outside diameter $\phi D2$ smaller than an outside diameter $\phi D1$ of each of the disk portion 32 of the outer wheel half 31 and the disk portion 63 of the inner wheel half 41. The center plate 33 is provided to increase rigidity of the disk portions 32, 63.

The center hole 41a of the inner wheel half 41 has a diameter $\phi d2$ larger than a diameter $\phi d1$ of each of the center hole 31a of the outer wheel half 31 and the center hole 33a on the center plate 33.

Referring again to FIG. 3, the center cap 43 is made from an elastic material such as rubber and comprises a cup-shaped body 43a and a wheel mounting portion 43b provided around an open edge of the body 43a for mounting the cap 43 to the front wheel 27. The wheel mounting portion 43b has first and second annular projections 43c, 43d for holding the disk portion 32 and the center plate 33 therebetween when the center cap 43 is fitted in the center holes 31a and 33a.

Figure 4:
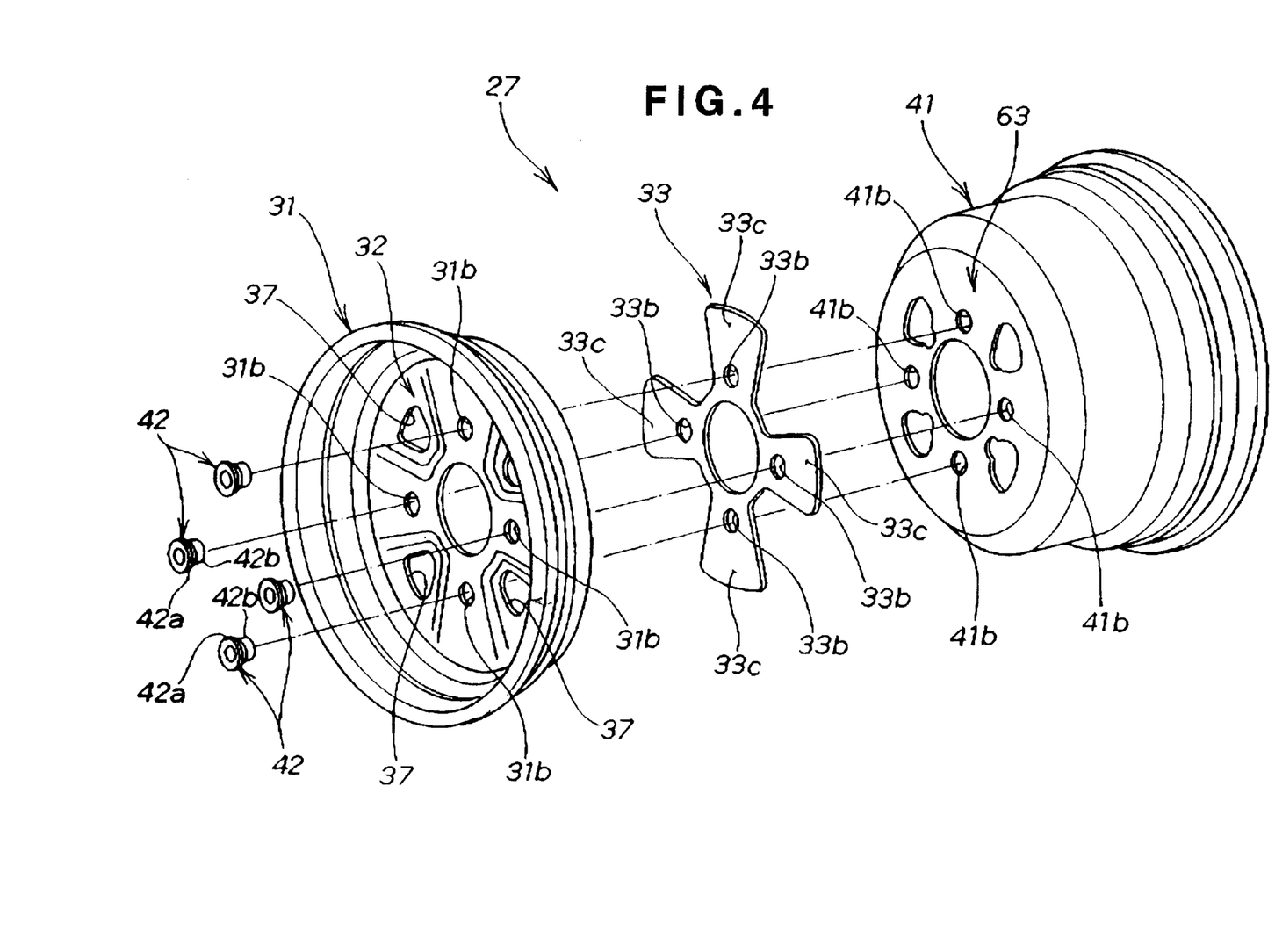
FIG. 4 is an exploded perspective view illustrating one of the wheels according to the present invention.

For obtaining the front wheel 27, the shallow-cup-shaped outer wheel half 31 and deep-cup-shaped inner wheel half 41 are mated together with the center plate 33 inter-posed therebetween, as shown in FIG. 4. Then, the washers 42 are fitted into connection holes 31b, 33b, 41b respectively formed in the outer wheel half 31, center plate 33, and inner wheel half 41, thereby integrally connecting the outer wheel half 31, center plate 33, and inner wheel half 41 together. In FIG. 4, the center cap 43 and the air valve 44 shown in FIG. 3 are omitted for clarity. The center plate 33 has a plurality of radially outwardly projecting portions 33c in which the connection holes 33b are formed.

As described above, the center plate 33 having the outside diameter smaller than the outside diameter of each of the disk portion 32 of the outer wheel half 31 and the disk portion 63 of the inner wheel half 41 is inter-posed between the disk portions 32 and 63. In addition, the outer wheel half 31, inner wheel half 41 and center plate 33 are integrally connected together by means of the washers 42 as nut sockets each comprised of a male tapered portion 42a as a countersunk head and a cylindrical portion or shank 42b. Thus, the center plate 33 is restricted only by the washers 42. As a result, it becomes possible to provide increased freedom in shaping the center plate 33 apart from portions around which the washers 42 pass, and hence to diversify the designing of the disk portion 32.

Since the outer wheel half 31, inner wheel half 41 and center plate 33 are integrally connected together by means of the washers 42, an outer periphery of the center plate 33 is not required to be welded for connection of the center plate to the outer and inner wheel halves 31, 41. As a result, it becomes possible to easily manufacture the front wheel 27 and hence to reduce the cost of manufacture thereof.

Further, since the outer periphery of the center plate 33 does not require welding, the outside diameter of the center plate 33 can be made smaller than that of each of the disk portions 32 and 63, whereby the center plate 33 can be made compact and light in weight.

Figure 5:
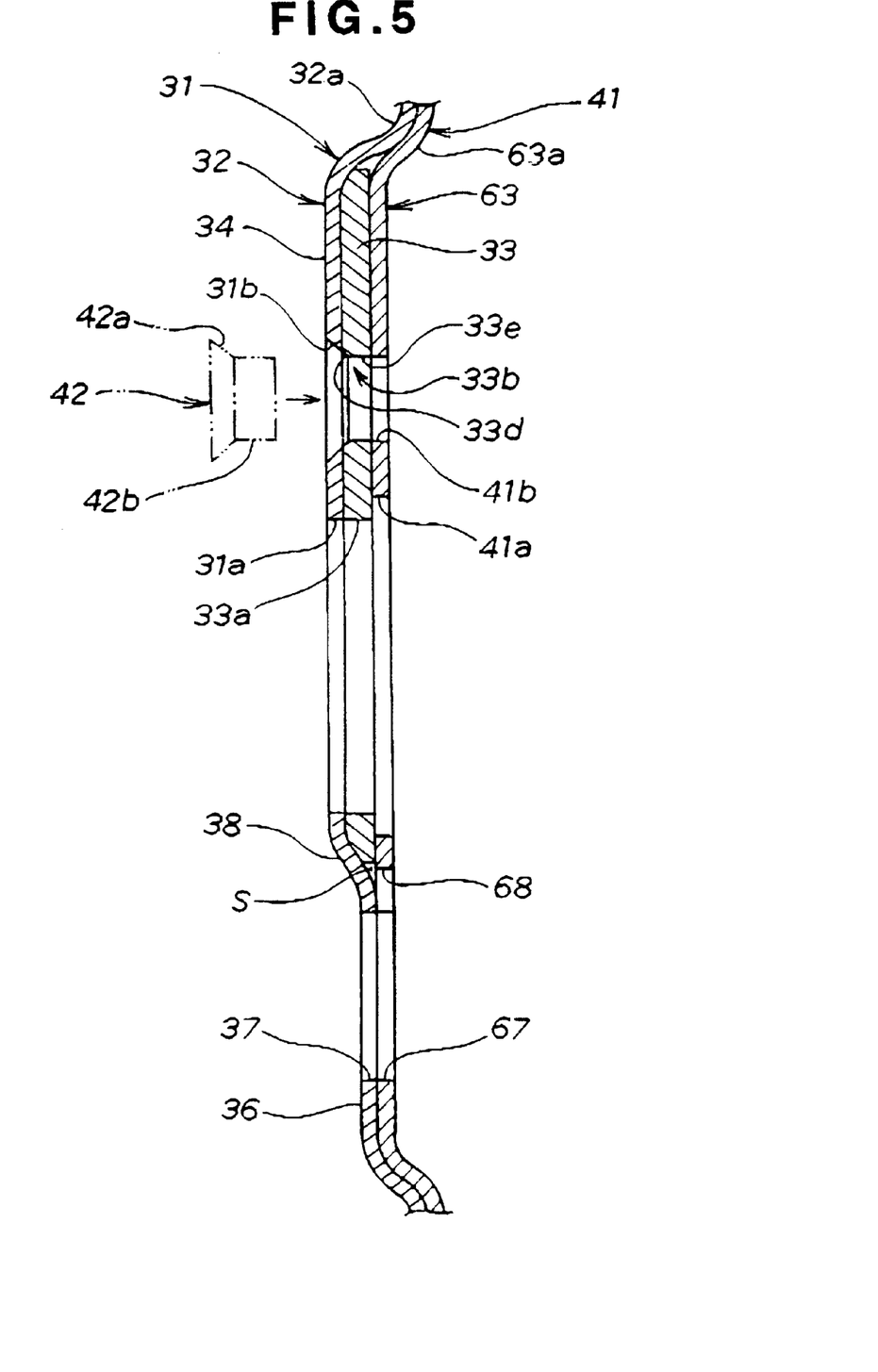
FIG. 5 is an enlarged partial sectional view illustrating outer and inner wheel halves shown in FIG. 3, with some of their parts omitted for clarity.

Reference is made next to FIG. 5 illustrating, on an enlarged scale, dominant parts of the outer and inner wheel halves 31, 41 shown in FIG. 3, with some other parts omitted for clarity.

As shown in FIG. 5, the disk portion 32 of the outer wheel half 31 is provided with the flat portion 34, recessed portions 36 and outer curved plane 32a. The center plate 33 takes the form of a flat plate. The flat disk portion 63 of the inner wheel half 41 is provided with the inner curved plane 63a.

The connection hole 31b of the outer wheel half 31 is tapered for allowing fitted engagement with the male tapered portion 42b of the washer 42.

The connection hole 33b of the center plate 33 is comprised of a tapered hole 33d extending from the tapered connection hole 31b and a horizontally straight hole 33e continuous with the tapered hole 33d. The male tapered portion 42a of the washer 42 is fitted into the tapered hole 33d while the cylindrical shank 42b of the washer 42 is fitted into the straight hole 33e.

The connection hole 41b of the inner wheel half 41 is horizontally straight so that the cylindrical shank 42b of the washer 42 can be fitted therein.

The inner wheel half 41 has windows 67 provided at positions corresponding to those of the windows 37 (only one shown in FIG. 5) of the outer wheel half 31. Each window 67 shaped identically to the window 37. On the central side of the disk portion 63, the window 67 has a notch 68 which serves as a discharge hole for communicating a space S defined between the outer wheel half 31 and the inner wheel half 41 with outside of the wheel.

Figure 6:
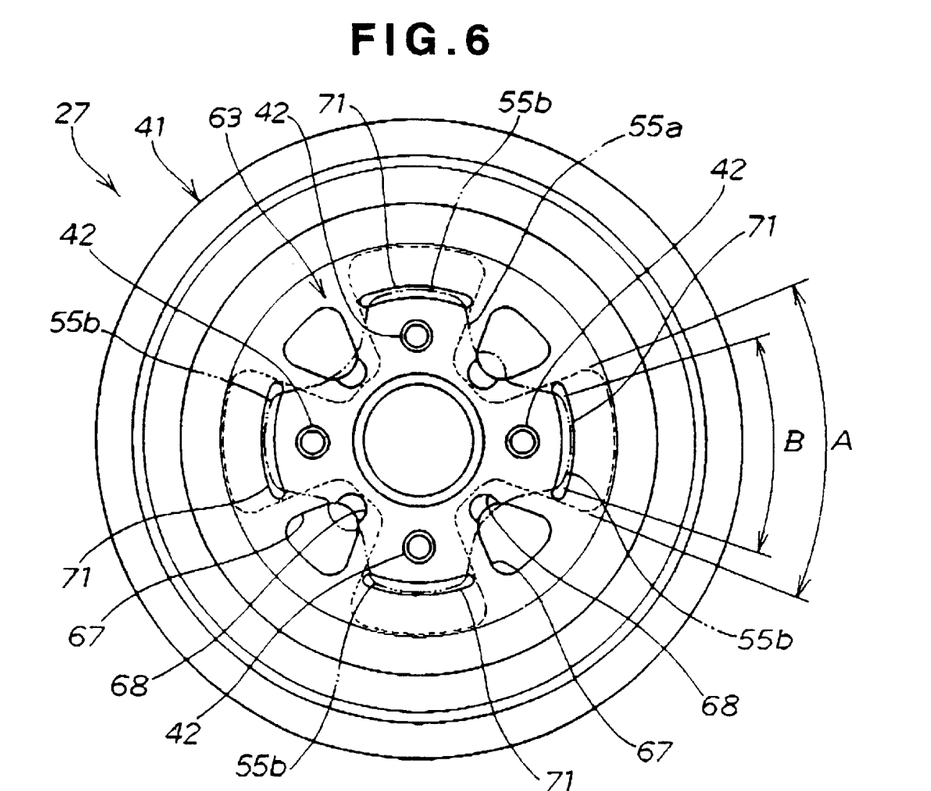
FIG. 6 is a rear view of the wheel, illustrative of the shape of the inner wheel half.

Reference is made next to FIG. 6 illustrating the inner wheel half 41 in rear elevation.

As shown in FIG. 6, the disk portion 63 of the inner wheel half 41 has a plurality of arcuate recesses 71 provided at positions corresponding to outer peripheral arcuate portions 55b of projections 55a of generally cruciform shape disposed on a surface of the brake drum 55 (see FIG. 3). In other words, the disk portion 63 of the inner wheel half 41 has the recesses 71 provided in opposed relation to the outer peripheries of the projections 55a. The recesses 71 are located radially outwardly of the washers 42. Arc length A of each recess 71 is larger than an arc length B of each outer peripheral arcuate portion 55b.

Figure 7A:
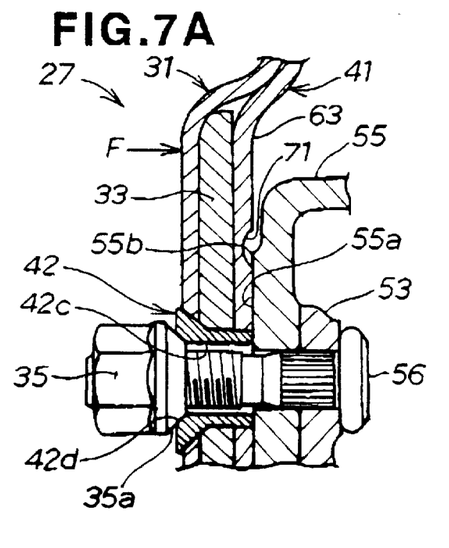
FIG. 7A is an enlarged partial sectional view illustrating the front wheel as attached to a hub.

Turning now to FIG. 7A, the front wheel 27 is mounted to the hub 53 by the bolts 56 fixed to the hub 53 and passed through the brake drum 55 and through-holes 42c of the washer 42, and the nuts 35 threadedly engaged with the bolts 56. Each washer 42 is comprised of the through-hole 42c and a female tapered portion 42d continuous to the through-hole 42c Rotational axis of the hub 53 is brought into aligned with a rotational axis of the front wheel 27 by fitting the male tapered portion 35a of the nut 35 in the female tapered portion 42d of the washer 42.

Figure 7B:
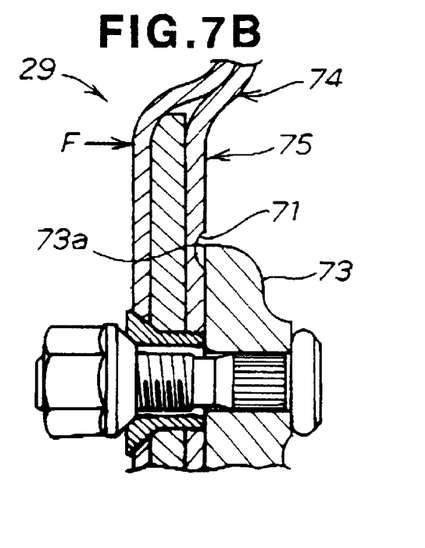
FIG. 7B is an enlarged partial sectional view similar to FIG. 7A but illustrating one of the rear wheels as attached to the hub.

Referring to FIG. 7B, the rear wheel 29 is mounted to a hub 73 which in turn is connected to an axle (not shown) of the rear wheel 16 (see FIG. 1). An inner wheel half 74 of the rear wheel 29 includes a disk portion 75 in the form of a fla plate.

The disk portion 75 has arcuate recesses 71 at positions corresponding to outer peripheral arcuate portions 73a (each being shaped identically to the outer peripheral arcuate portion 55b of the projection 55a shown in FIG. 7A) of the hub 73. In other words, the disk portion 75 of the rear wheel 29 has the recesses 71 provided in opposed relation to the outer periphery of the hub 73.

A function of the recesses 71 will be described below.

Referring back to FIG. 7A, when an external force F in a direction toward the axle (from left to right in the Figure) is applied from a road surface to the front wheel 27 via the tire 26 (see FIG. 1) upon running of the buggy 10 (see FIG. 1), particularly, upon cornering of the buggy 10, the disk portion 63 of the inner wheel half 41 is deflected in the direction toward the axle, that is, to the brake drum side.

At this time, due to the presence of the recesses 71, interferences between the disk portion 63 and the outer peripheral arcuate portions 55b of the brake drum 55 can be avoided.

Similarly, presence of the recesses 71 shown in FIG. 7B prevents interferences between the disk portion 75 and the outer peripheral arcuate portions 73a of the hub 73.

A function of the notches 68 of the front wheel 27 will described below with reference to FIG. 8.

Figure 8:
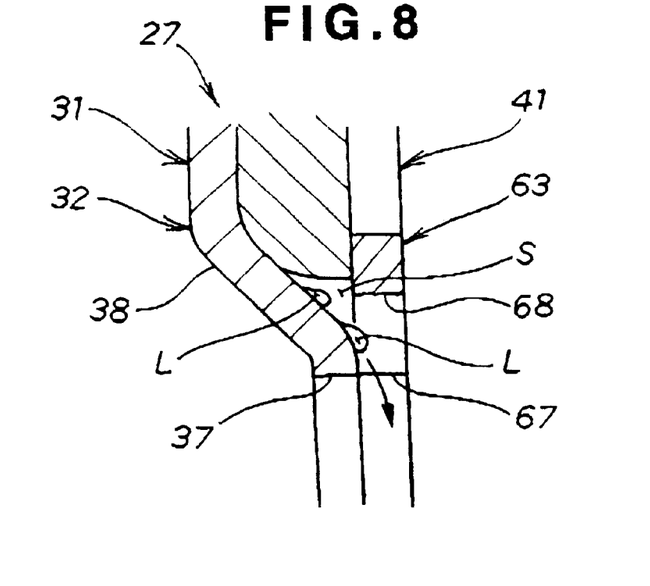
FIG. 8 is a view illustrating a function of notches provided in the front wheel half.

When a liquid L such as a surface-treatment liquid used in the process of manufacturing the front wheel 27 or water splashed onto the front wheel 27 upon running of the vehicle on the front wheel 27 enters into the space S between the outer wheel half 31 and the inner wheel half 41, the liquid in flows from the notches 68 out to outside through the windows 37, 67, as shown by an arrow in FIG. 8.

Since the notches 68 are formed in at least one of the disk portions 32 for discharging the liquid L such as water and surface-treatment liquid accumulated between the disk portions 32, 63, it becomes possible to prevent the disk portions 32, 63 from getting rusted and corroded.

Figure 9A:
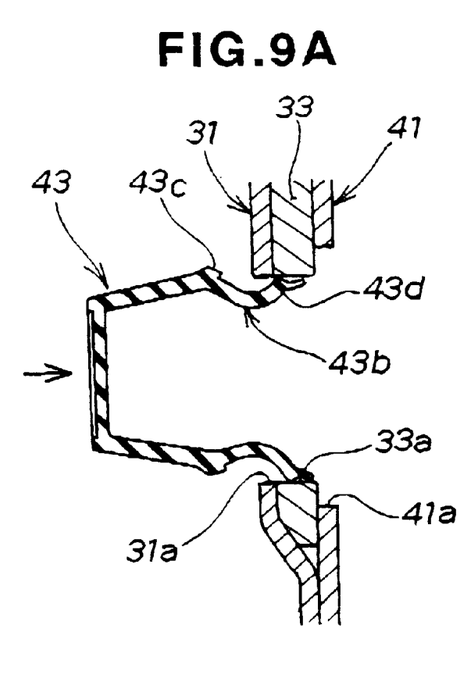
FIGS. 9A and 9B are enlarged partial sectional views illustrating a manner of attachment of a center cap to the wheel.
Figure 9B:
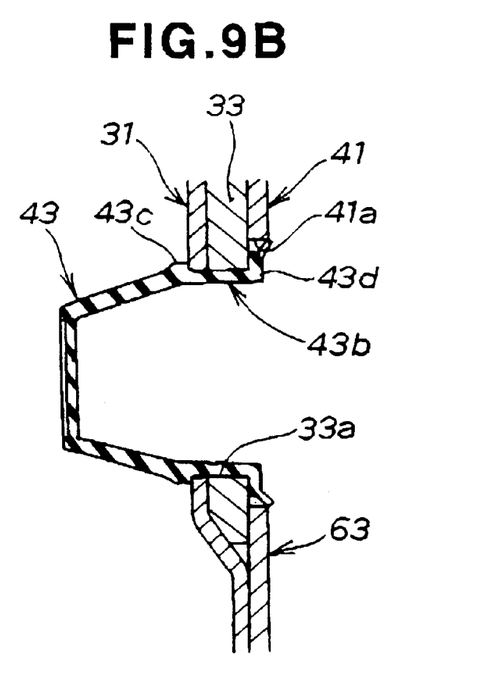

Manner of attachment of the center cap 43 will now be discussed with reference to FIGS. 9A and 9B As shown in FIG. 9A, the wheel mounting portion 43b of the center cap 43 is elastically deformed to have a reduced diameter and fitted into the center hole 31a of the outer wheel half 31 and the center hole 33a of the center plate 33.

Continuously, the center cap 43 is inserted deeper until the first projection 43c abuts against the outer wheel half 31. At this time, the second projection 43d is elastically spread in the center hole 41a of the inner wheel half 41, whereby the first and second projections 43c and 43d are set in such a manner as to hold the outer wheel half 31 and the center plate 33 therebetween. This completes the mounting of the center plate 43.

By virtue of the center hole 31a formed at the center of the outer wheel half 31, the center hole 33a formed at the center of the center plate 33, and the center hole 41a having the diameter larger than that of the center hole 33a of the center plate 33 and formed in the disk portion 63 opposed to the drive shaft 52 (see FIG. 3), the second projection 43d at the tip of the center cap 43 can be spread in and caught by the center hole 41a of the disk portion 63. That is, the outer wheel half 31 and the center plate 33 can be held by the first and second projections 43c and 43d to thereby prevent slip-off of the center cap 43 from the front wheel 27. The center cap 43 can thus be fixed to the front wheel 27 easily.

As can be readily appreciated by skilled artisans, the wheel arrangement of the present invention can be applied not only to ATVs but also to other vehicles such as motorcycles, motor tricycles, four-wheeled cars, industrial machines and carts.

Obviously, various minor changes and modifications of the present invention are possible in the light of the above teaching. It is therefore to be understood that within the scope of the appended claims the invention may be practiced otherwise than as specifically described.

What is claimed is:

1. A wheel for a vehicle, said vehicle having an axle with a hub connected thereto, said wheel comprising:

first and second wheel halves joined together, each of said wheel halves having a disk portion and a rim continuing from said disk portion; and a center plate inter-posed between said disk portions of said wheel halves, said center plate having a first diameter smaller than an outside second diameter of each of said disk portions, one of said first and second wheel halves having an outer curved portion and the other of said first and second wheel halves having an inner curved portion between said first diameter and said rims, said first wheel half, said second wheel half and said center plate being fixedly connected together and to said hub with a plurality of washers, bolts, and nuts;

said first and second wheel halves being fixedly connected together with a weld, said weld due to said outer and inner curved portions being offset inwardly toward said vehicle relative to a straight line passing vertically through said center plate when said wheel is mounted on said vehicle.

2. A wheel for a vehicle, according to claim 1, wherein said rim of said one wheel half positioned closer to the vehicle has a top end and a flange at the top end of the flange, said flange having a flank formed on a side surface thereof so that a clearance is left during steering of the vehicle.

3. A wheel for a vehicle, said vehicle having an axle with a hub connected thereto, said hub having a peripheral edge, said wheel comprising:

first and second wheel halves joined together, each of said wheel halves having a disk portion and a rim continuing from said disk portion;

a center plate inter-posed between said disk portions of said wheel halves, said center plate having a diameter smaller than outside diameters of each of said disk portions;

said first wheel half, said second wheel half and said center plate being fixedly connected together and to said hub with a plurality of washers, bolts, and nuts; and said second wheel half being positioned closer to the vehicle when said wheel is mounted to the hub which is connected to the axle of the vehicle, said disk portion of said second wheel half having recesses located radially outwardly of said washers, bolts, and nuts at portions thereof opposed to the peripheral edge of the hub.

4. A wheel for a vehicle, according to clam 3, wherein at least one of said disk portions has a discharge hole located in said one disk portion at a diameter greater than the diameter of said center plate, said discharge hole for discharging water and a wheel surface treating liquid accumulated between said disk portions.

5. A wheel for a vehicle, according to claim 3, wherein said center plate has a hole formed centerally thereof, and said disk portion of said second wheel half has a hole formed centrally thereof and being larger than said hole of said center plate.

* * * * *